July 31, 1951 E. H. GREIBACH 2,562,183
BIFILAR SUSPENSION FOR ELECTRICAL MEASURING INSTRUMENTS
Filed July 22, 1949 10 Sheets-Sheet 1
Fig. 1.
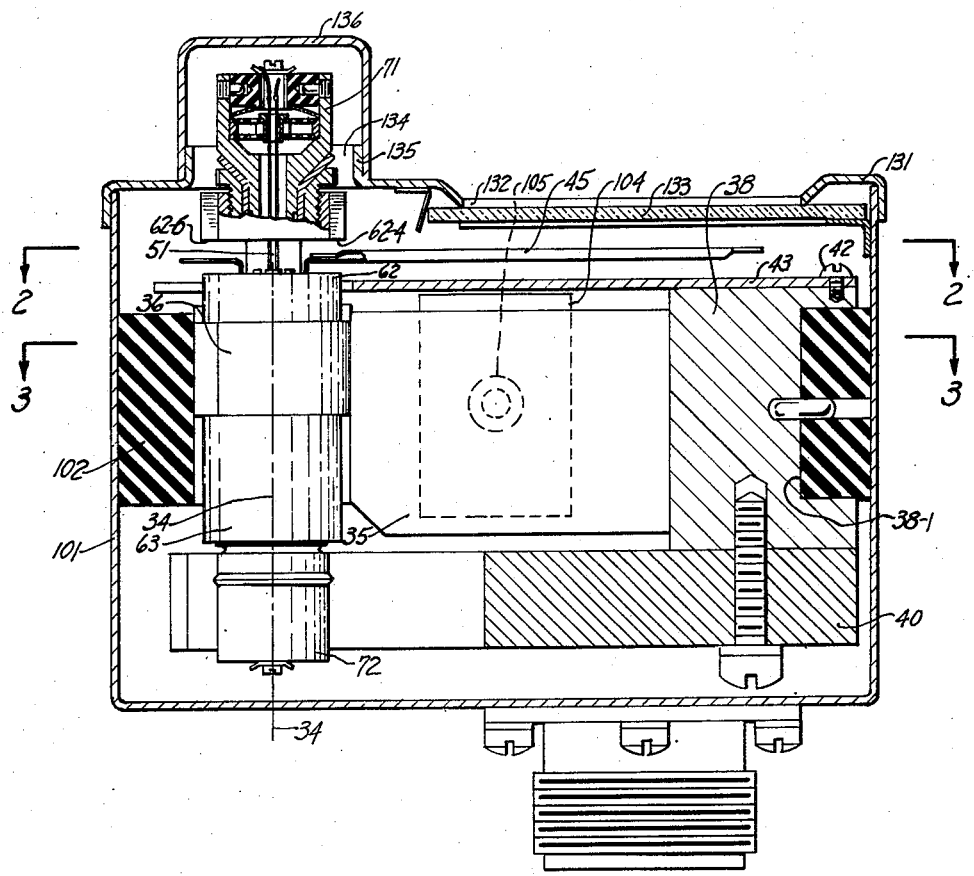
Fig. 3-A.
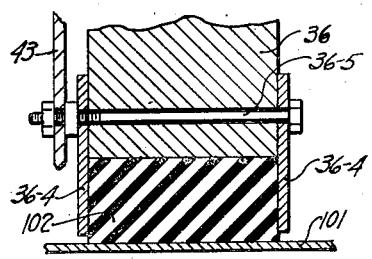
INVENTOR.
EMIL H. GREIBACH
BY
Pineles & Greene
ATTORNEYS July 31, 1951 E. H. GREIBACH 2,562,183
BIFILAR SUSPENSION FOR ELECTRICAL MEASURING INSTRUMENTS
Filed July 22, 1949 10 Sheets-Sheet 2
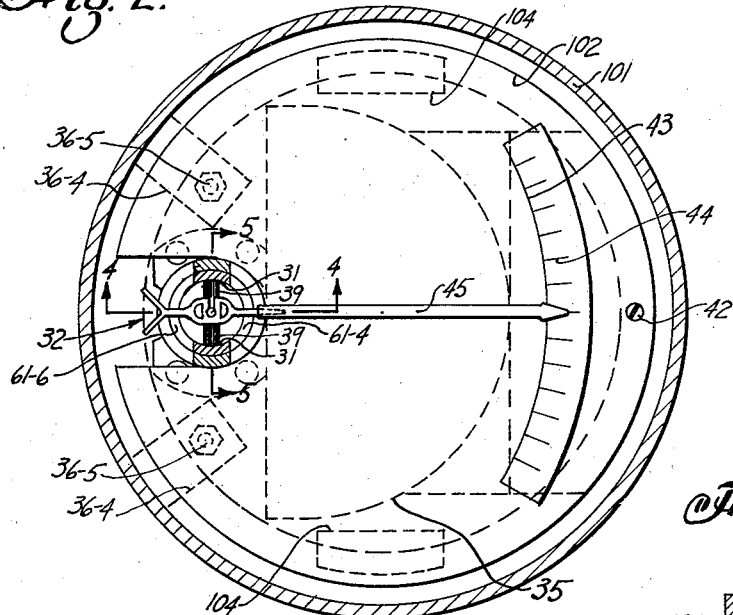
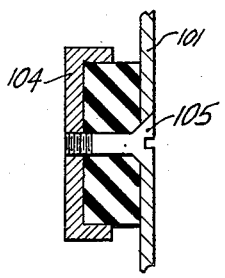
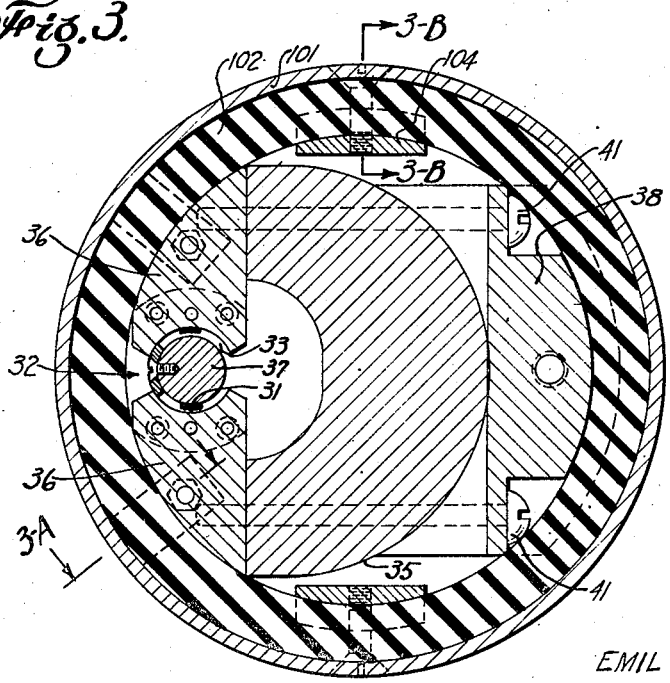
INVENTOR.
EMIL H. GREIBACH
BY
Pineles & Greene
ATTORNEYS

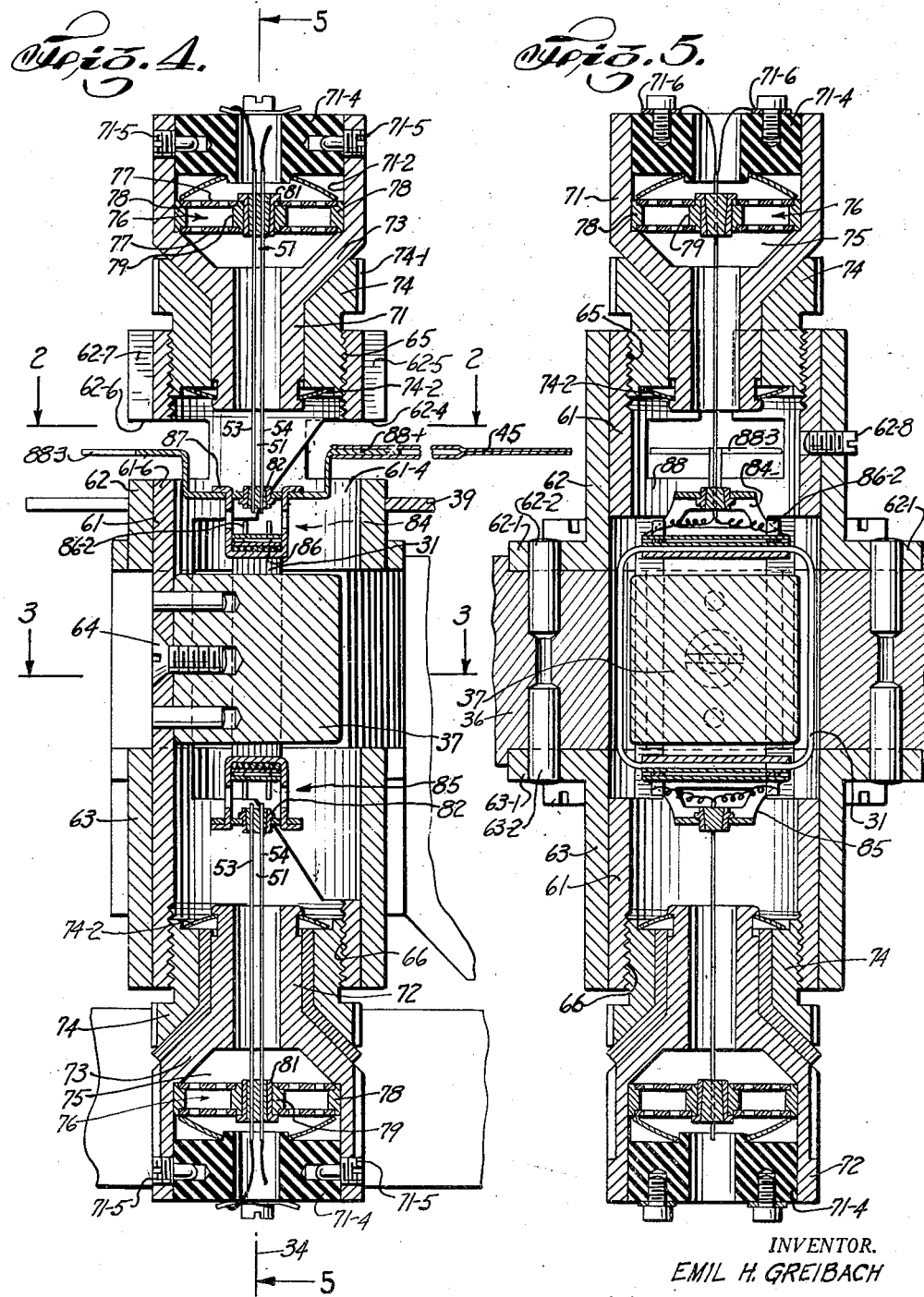

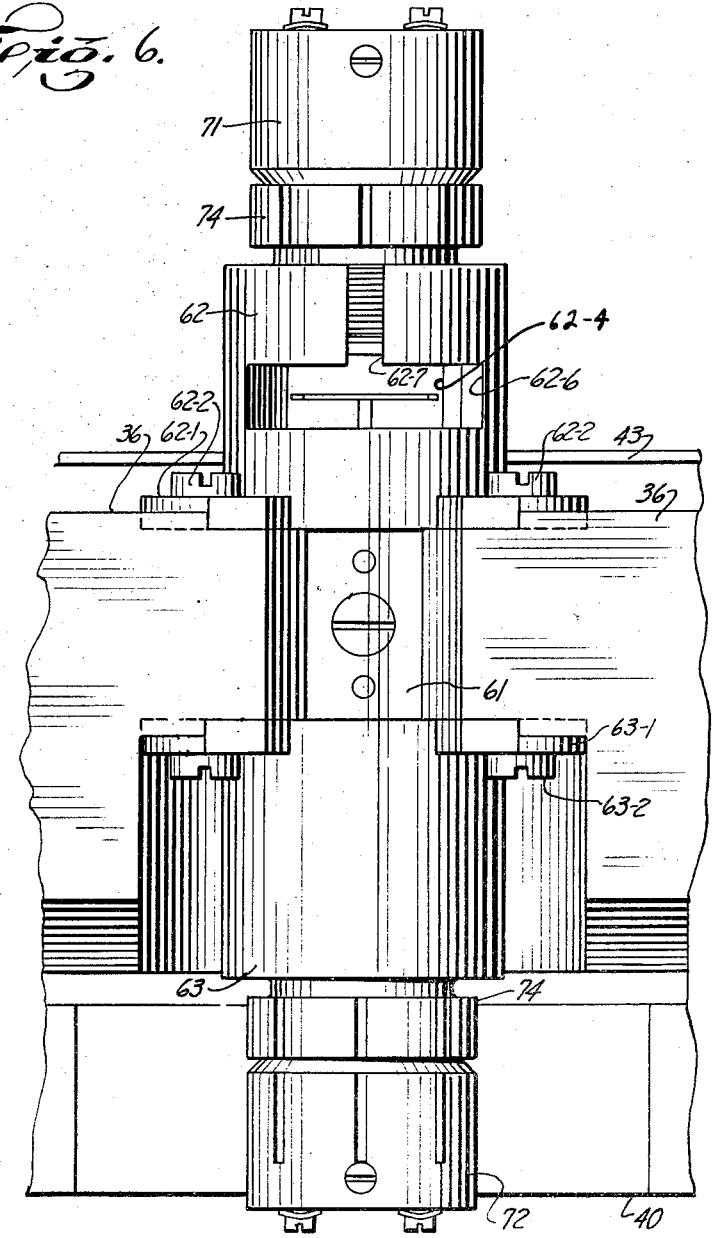

July 31, 1951 E. H. GREIBACH 2,562,183
BIFILAR SUSPENSION FOR ELECTRICAL MEASURING INSTRUMENTS
Filed July 22, 1949 10 Sheets-Sheet 5
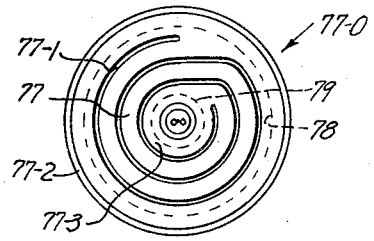
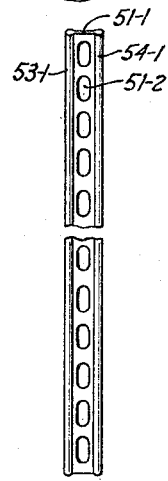
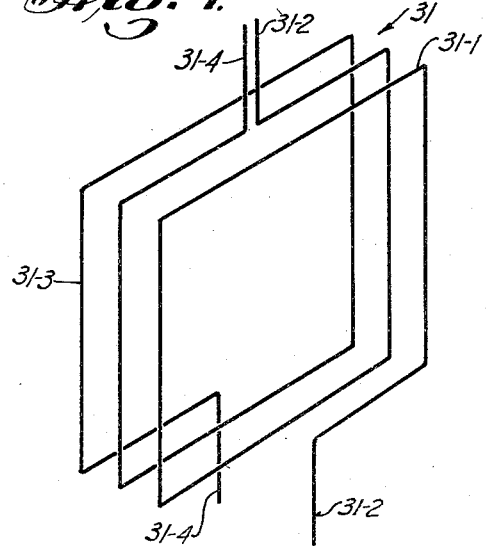
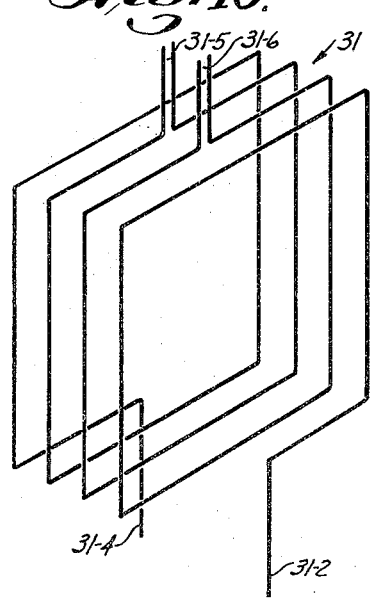
INVENTOR.
EMIL H. GREIBACH
BY
ATTORNEYS July 31, 1951  E. H. GREIBACH  2,562,183
BIFILAR SUSPENSION FOR ELECTRICAL MEASURING INSTRUMENTS
Filed July 22, 1949  10 Sheets-Sheet 6

INVENTOR.
EMIL H. GREIBACH
BY
Pineles & Greene
ATTORNEYS

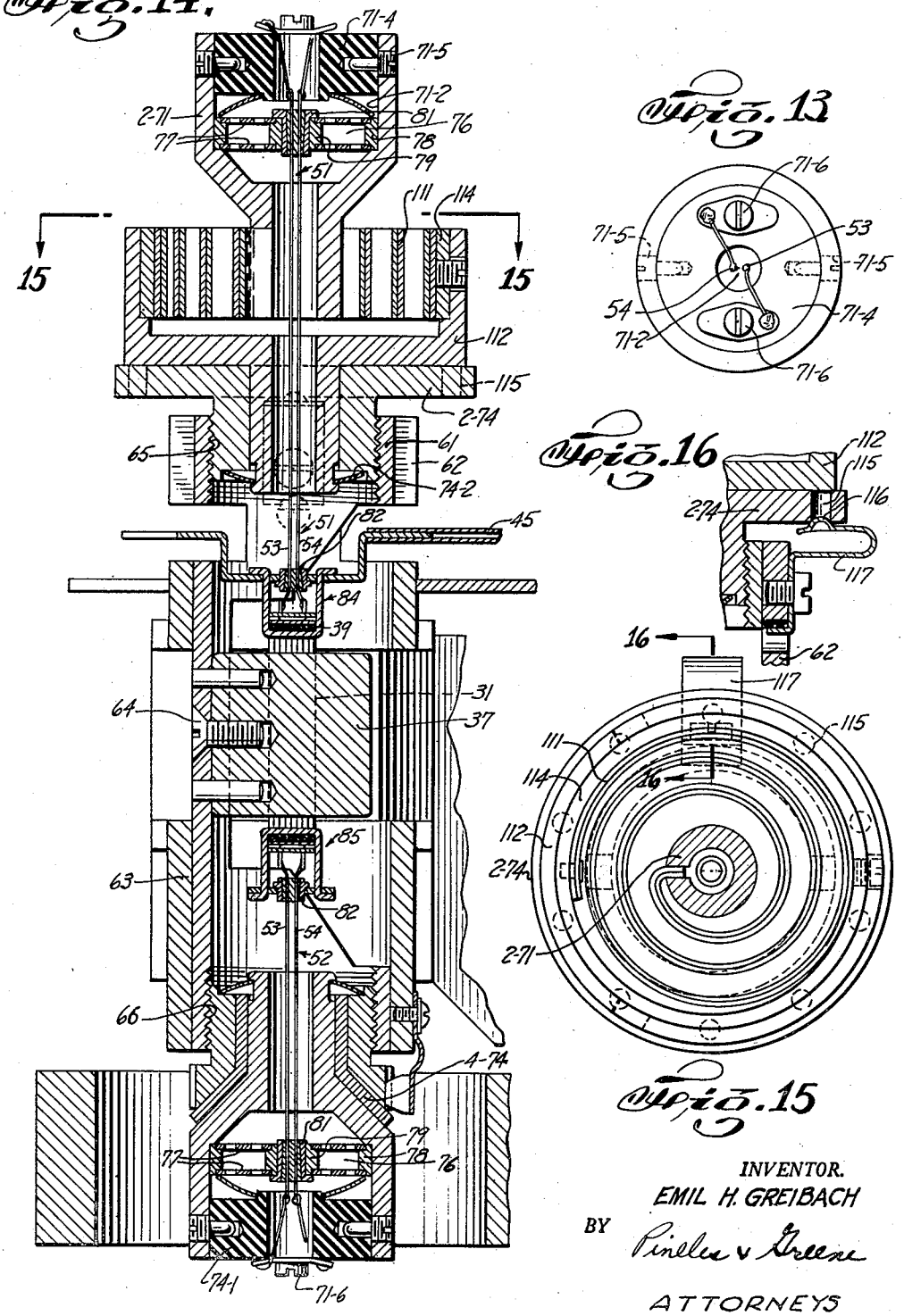

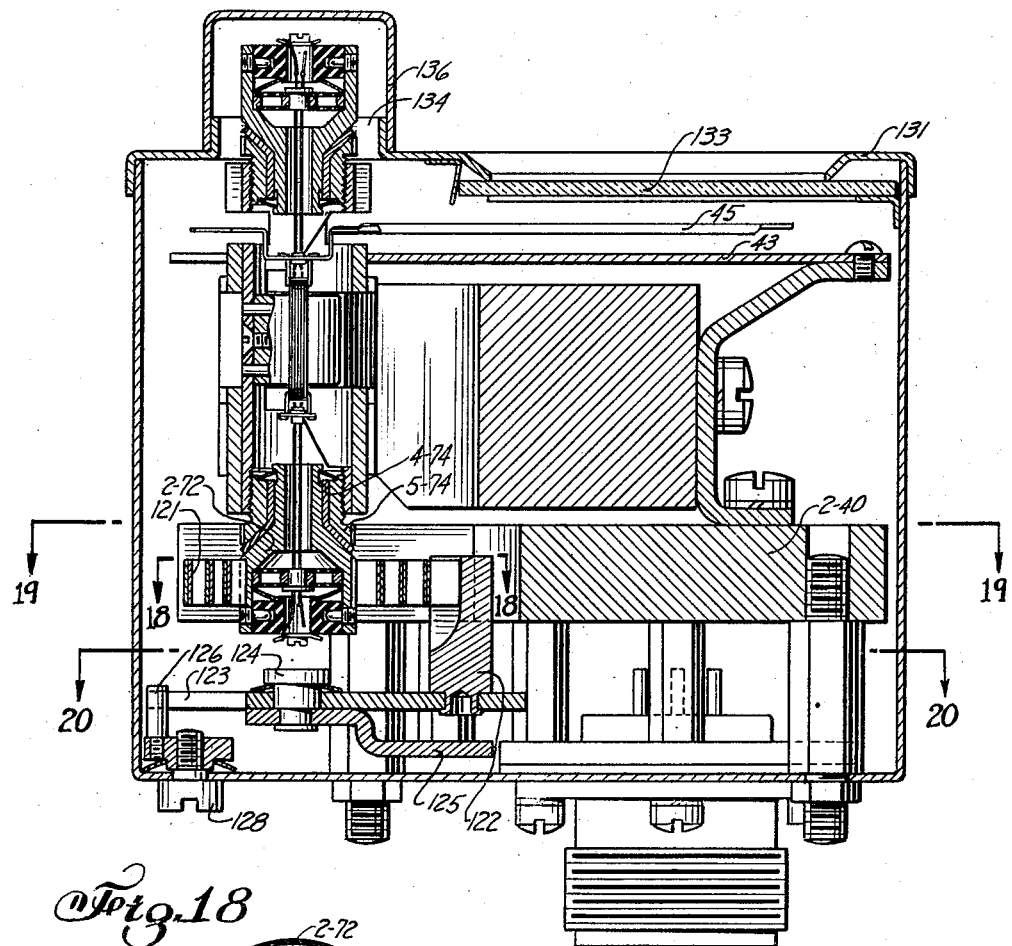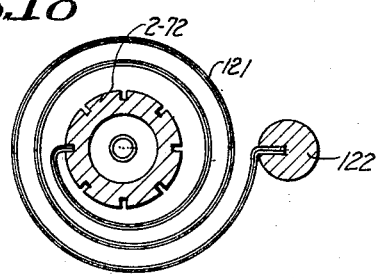

July 31, 1951  E. H. GREIBACH  2,562,183
BIFILAR SUSPENSION FOR ELECTRICAL MEASURING INSTRUMENTS
Filed July 22, 1949  10 Sheets-Sheet 9

INVENTOR.
EMIL H. GREIBACH
BY
ATTORNEYS

July 31, 1951 E. H. GREIBACH 2,562,183
BIFILAR SUSPENSION FOR ELECTRICAL MEASURING INSTRUMENTS
Filed July 22, 1949 10 Sheets-Sheet 10
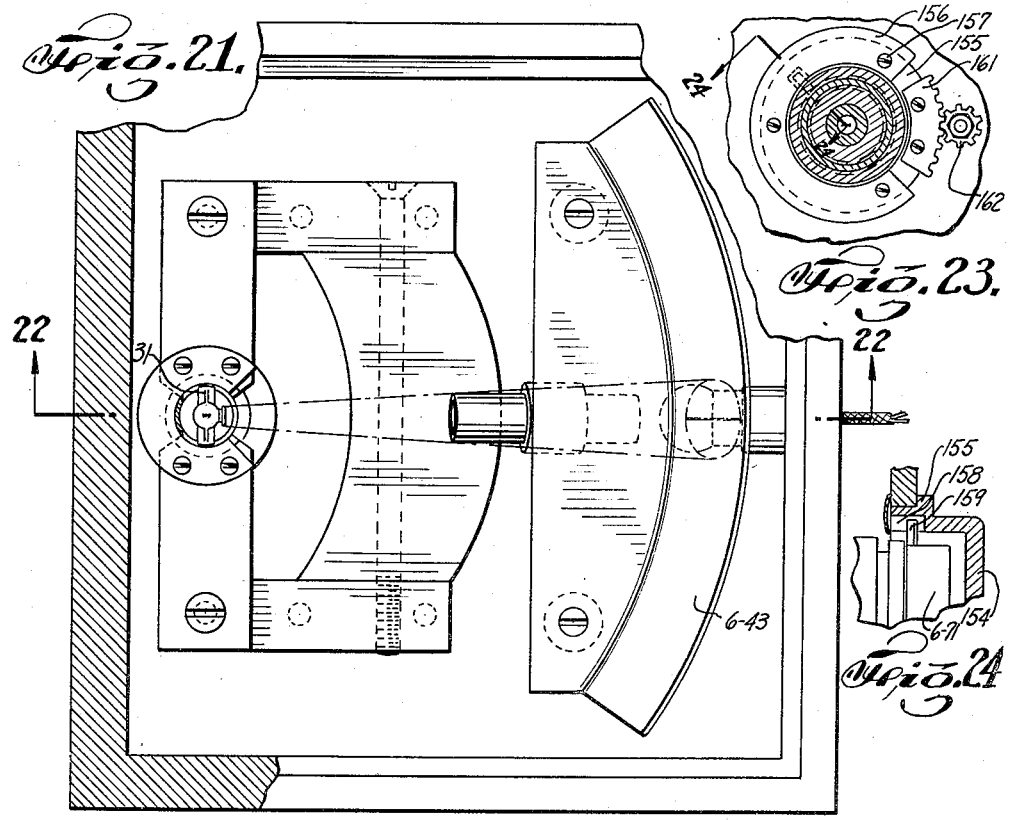
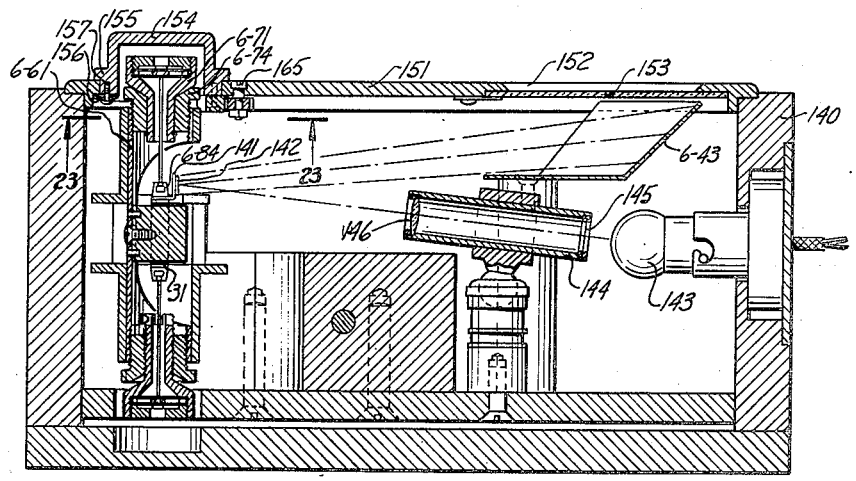
INVENTOR
EMIL H. GREIBACH
ATTORNEYS Patented July 31, 1951

2,562,183

UNITED STATES PATENT OFFICE 2,562,183

BIFILAR SUSPENSION FOR ELECTRICAL MEASURING INSTRUMENTS

Emil H. Greibach, New Rochelle, N. Y.

Application July 22, 1949, Serial No. 106,270

21 Claims. (Cl. 171—95)

This application is a continuation-in-part of my co-pending application, Serial No. 648,970, filed February 20, 1946, now abandoned.

This invention relates to bifilar suspension for electrical measuring instruments and more particularly to galvanometer instruments of the D'Arsonval type in which a relatively heavy coil is deflected in a circular gap of a magnetic field structure for giving an accurate indication of the current flowing through the coil.

Two types of such galvanometers have come into use, one in which the relatively heavy coil is supported by a mechanical coil pivot, the other in which the coil is supported by a filar suspension.

Galvanometers with a mechanical coil pivot came into very wide use as a mass production instrument of limited sensitivity, and they also found wide use as portable instruments of relatively high sensitivity. However, the mechanical coil pivot of such galvanometers introduces frictional torque which becomes very objectionable in a high sensitivity instrument of several microamperes full scale. Thus, for example, a typical galvanometer instrument having a sensitivity of 5 microamperes full scale, has in most cases, a friction error amounting to ½% of the full scale deflection. When such galvanometer is used for a longer time, it is subject to accidental small shocks, and the friction error will increase appreciably above the ½% full scale deflection, thus greatly limiting the accuracy and usefulness of such galvanometers.

Galvanometers with a filar coil suspension are free of this friction error and are therefore much more effective for measurements requiring high sensitivity and great accuracy. However, they found only limited commercial use because they require accurate leveling for maintaining the axis of the coil in a vertical position and they also require protection against mechanical shocks. For the operativeness of such filar suspension galvanometers, it was believed essential that the coil suspension structure be subjected to only little tension and they were designed with suspension members several inches long which permitted the coil structure to move along the axis of the coil over a limited range. As a result, all prior filar suspension galvanometers, designed for operation at a high sensitivity, required leveling of the coil in a vertical axis and protection against shocks.

The history of what has been done commercially correctly evidences the inability of the art heretofore to devise a practical filar suspension- type galvanometer that does not require leveling and that could be used in all axial positions of the coil in the same manner as the mechanical coil pivot galvanometers but free of their friction error and therefore capable of operating with high sensitivity and accuracy.

The present invention is based on the discovery that filar suspension-type galvanometers may be made to operate with extremely high sensitivity with the coil axis either in vertical, horizontal or any intermediate positions, and without requiring leveling of the instrument, by making the filar coil suspension members not more than about 1.5 inch long and applying to the filar suspension members an axial tension many times greater than the weight of the coil structure.

The foregoing and other objects of the invention will be best understood from the following description of exemplifications thereof, reference being had to the accompanying drawings wherein Fig. 1 is a cross-sectional view of one form of instrument exemplifying the invention specifically designed for uses in which it is subjected to vibratory forces, such as for aircraft;

Figs. 2 and 3 are cross-sectional views along lines 2—2 and 3—3 of Fig. 1, respectively;

Fig. 2A is a cross-sectional view along line 2A—2A of Fig. 2;

Fig. 3A is a cross-sectional view along line 3A—3A of Fig. 3;

Figure 11:
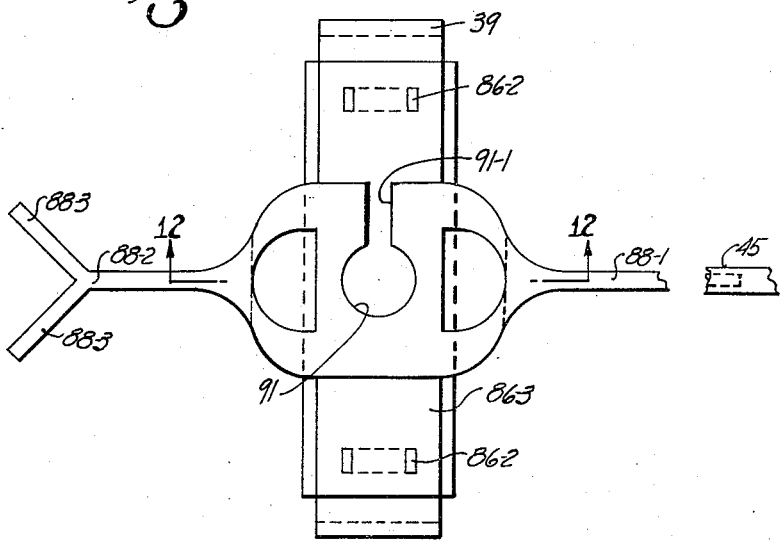
Figure 12:
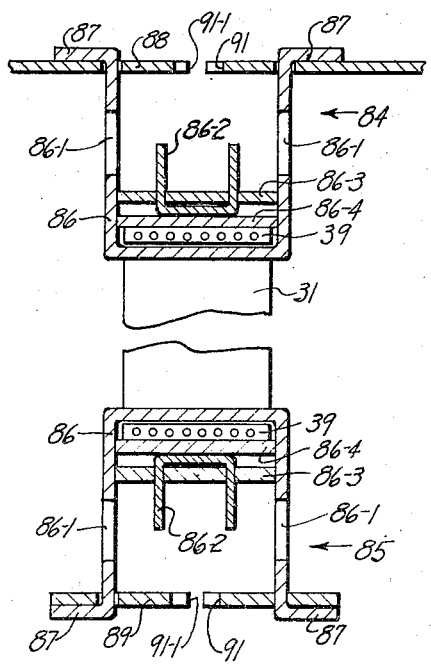
Figure 19:
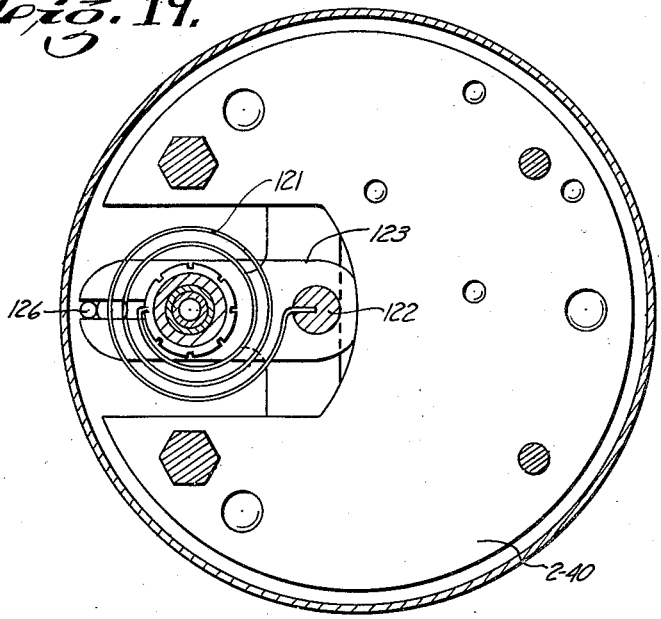
Figure 20:
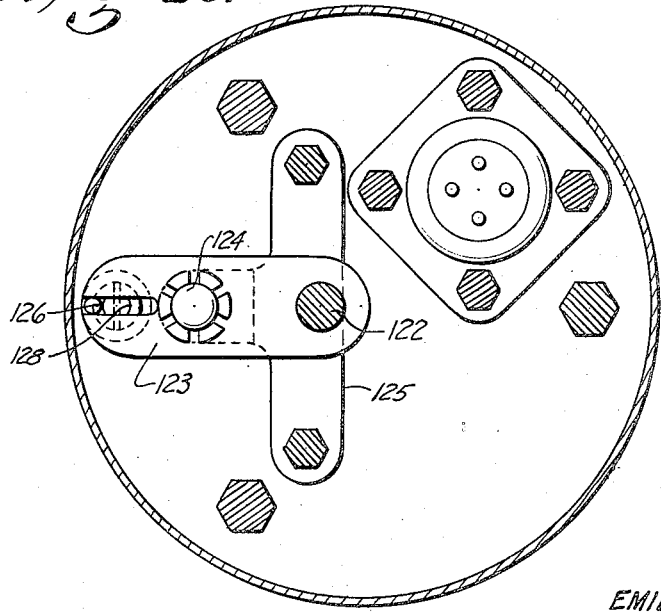

Figs. 4 and 5 are vertical cross-sectional views of the instrument along lines 4—4 and 5—5, respectively, of Fig. 2;

Fig. 6 is a side view of the internal structure of the instrument as seen from the left side of Fig. 1;

Fig. 7 is a modified form of a bifilary suspension member embodying features of the invention;

Fig. 8 is a plan view of a tensioning spring unit of the instrument;

Figs. 9 and 10 are diagrammatic views illustrating different types of coil windings of an instrument exemplifying the invention;

Fig. 11 is a top view of the coil unit with the suspension connector elements mounted thereon;

Fig. 12 is a cross-sectional view along line 12—12 of Fig. 11;

Fig. 13 is a top view of the movement suspension structure shown in Figs. 4 and 5;

Fig. 14 is a cross-sectional view similar to Fig. 4 illustrating features of a modified form of instrument exemplifying the invention;

Fig. 15 is a view along line 15—15 of Fig. 14;

Fig. 16 is a view along line 16—16 of Fig. 15;

Fig. 17 is a cross-sectional view similar to Fig. 1 illustrating another modified form of instrument exemplifying the invention;

Fig. 18 is a view along line 18—18 of Fig. 17;
Fig. 19 is a view along line 19—19 of Fig. 17;
Fig. 20 is a view along line 20—20 of Fig. 17;
Fig. 21 is a plan view of the open side of a high sensitivity table-type instrument exemplifying the invention with the cover removed and parts of the casing broken away;
Fig. 22 is a cross-sectional view along line 22—22 of Fig. 21;
Fig. 23 is a cross-sectional view along line 23—23 of Fig. 22; and
Fig. 24 is a cross-sectional view along line 24—24 of Fig. 23.

In Figs. 1 to 6 are shown the principal elements of a three-inch galvanometer exemplifying one form of the invention. It comprises a moving coil 31 and a cooperating field magnet core structure, generally designated 32, which is designed to maintain a uniform unidirectional field in two non-magnetic air gaps 33 thereof within which the two opposite operative sides of the coil 31 are arranged to swing around a central axis indicated in Fig. 1 by dash-dot line 34 and extending through the center of the circle of which the arcuate gaps 33 form a part.

The magnetic field structure 32 is shown formed of a field inducing permanent magnet 35 to the opposite poles of which are connected two pole members 36 which form with an intermediate central cylindrical core element 37 a substantially closed magnetic circuit separated by the two arcuate gaps 33 in which the two sides of the coil 31 swing. The permanent magnet 35 and the two pole members are held clamped to each other and to a rearward mounting block 38 of a material, such as brass, by suitable means, such as two screws 41 so as to form therewith a rigid structure or assembly to one side of which is secured, as by screws 42, a dial plate 43 provided with a scale 44 on which a pointer 45 carried by the swinging coil 31 indicates the magnitude of the electric current traversing the coil.

In accordance with one phase of the invention, the moving coil of such instrument is rotatably supported by a novel elastically-deformable filar suspension structure. As indicated more in detail in Figs. 4 and 5, the suspension structure shown has two axially aligned bifilary suspension members 51 connected to the opposite transverse outer sides 39 of the coil 31 for holding it resiliently suspended in its swinging operative position.

Each of the bifilary suspension members is formed either of two distinct closely spaced wire-like suspension elements 53, 54, generally arranged in the manner shown in Figs. 4 and 5, or as shown in Fig. 7, in the form of two bifilary suspension members 53—1, 54—1 interconnected by a web 51—1 so that they constitute a part of an integral suspension member structure in which they operate substantially in the same manner as two distinct closely spaced suspension member elements, in the manner explained more in detail hereinafter. When bifilary suspension members, such as suspension members 51, shown in Figs. 4 and 5, are subjected to an initial tensioning force, the elastic restoring forces exerted by the suspension members, in opposing the deflection of the coil, are directly proportional to the initial tensioning force to which the suspension members are subjected and inversely proportional to the square of the distance between the two spaced suspension elements 53, 54 of each suspension member 51.

In accordance with the invention the filary coil suspension members are made of a length of only about 1.5 inches or less and they are maintained under tension forces at least about 50 times the weight of the coil for maintaining the coil substantially in its coaxial concentric operative position within the air gap and minimizing axially-transverse motion of the coil when the axis of the coil is in either horizontal or vertical or any intermediate position.

The elements associated with the moving coil and its suspension structure are held in their proper operative positions relatively to the rigid magnet assembly by an aligning structure having aligning surfaces engaging a cooperating set of aligning surfaces formed on the magnetic field structure and a cooperating set of aligning surfaces formed on elements of the coil suspension structure.

According to a further phase of the invention, the initial tension of the spring suspension which is applied to the two coil suspension members is provided by connecting to at least one outer end of a suspension member, a tensioning structure formed of one or more pairs of coaxially symmetric cantilever springs of great radial rigidity and the required degree of axial flexibility. These are arranged in such manner as to maintain the filary suspension members and the coil in their central axial position, while permitting substantial deflection of the cantilever springs under abnormal forces which occur, for instance, when the instrument is subjected to external shocks or vibrational forces which tend to move the coil away from its normal operative position. With such cantilever spring tensioning arrangement, the cantilever springs will be elastically deflected and permit the coil to move out from its axially aligned central operative position when it is subjected to sudden shocks or large vibrational forces without exposing any elements of the instrument to excessive strains that would disturb its adjustment.

In the form of instrument shown in Figs. 1 to 6, the aligning structure, shown in detail in Figs. 4 and 5, has a tubular aligning member 61 of brass, for instance, which is connected to the pole pieces 36 of the magnetic field structure through two aligning collars 62, 63 of similar material. The tubular aligning member 61 has an intermediate portion provided with an inwardly facing aligning surface serving as an aligning support for the central cylindrical core member 37 of the field structure, a screw 64 serving to secure the core member 37 to the aligning sleeve member 61. The upper and lower end portions of the aligning sleeve member 61 are provided with inwardly facing aligning surface elements 65, 66 which serve as aligning supports for two suspension structures of the coil, including the upper and lower suspension heads, of brass, for instance, generally designated 71, 72, to which the outer ends of the two suspension members 51 are connected.

Each suspension head 71, 72 is formed of a funnel-like tubular member having an element 73 of reduced width rotatably seated in an adjusting collar 74 engaging the inwardly facing aligning surfaces 65, 66 of the tubular aligning member 61. Each of the suspension heads 71, 72 has an annularly-shaped spring support which supports in its circular outwardly-opening inner space 75 the tensioning spring means 76.

As shown in Figs. 4 and 5, and in the plan view of Fig. 8, the tensioning spring means 76 are shown formed of two similar cantilever springs 77, the outer ends of which are connected to an outer circular junction element 78 and the inner ends of which are connected to an inner circular junction element 79. As shown in Fig. 8, each of the two cantilever springs 77 is formed of a circular disc of a metallic spring material having cut therein spiral grooves 77—1 so as to form out of it a long spirally-shaped spring, the outer end of which is formed by a circular mounting portion 77—2 and the inner end of which is formed of a circular mounting portion 77—3. The two cantilever springs 77 of each spring means 76 are alike, except that they are of opposite direction, that is, one spring element 77 of each spring means 76 form a counterclockwise spiral and the other spring element 77 a clockwise spiral.

The outer and inner junction elements 78, 79 of the two springs of each spring unit 76 are shown formed of two short circular elements, the ends of which are provided with recessed seating portions in which are seated the outer and inner mounting portions 77—2, 77—3 of the two spiral cantilever springs 77. The mounting ends of the two springs are suitably united, as by soldering, to the opposite ends of the two cylindrical junction elements 78, 79, so that they form therewith a unitary self-supporting tensioning spring unit 76.

The outwardly opening cylindrical housing space of each suspension head 71, 72 has a circular shoulder portion forming a circular seating surface on which the outer cylindrical junction element 78 of the spring unit rests. The inner junction element 79 of each spring unit serves as a mounting support for the outer ends of the two coil suspension members 51 which hold the moving coil 31 rotatably suspended in the arcuate gap 33 of the magnetic field structure.

In accordance with one phase of the invention, each of the coil suspension members 51 has its inner end arranged for detachable interconnection with a transverse outer side 39 of the moving coil 31 and has its outer end arranged for detachable interconnection with the associated tensioning spring 76. As shown in Figs. 4 and 5, the outer and inner end regions of each suspension member 51 extend through hollow bead-like anchoring elements 81, 82, respectively, to which they are affixed as by filling the hollow spaces of the anchoring beads 81, 82 with a fusible body of a stable hardened cementing compound. The outer suspension anchor 81 has an elongated portion which enters the interior hollow space of the inner spring junction member 79, being retained therein by the wider outer shoulder portion of the anchoring element 81.

The moving coil 31 of such instrument is made by winding a thin insulated conduction wire over a suitably-shaped mandrel into the desired rectangular shape shown in Figs. 4, 5, 11 and 12. In winding the coil 31, a coating of cement is placed over each winding layer of the coil, and upon completion of the winding of the several layers of the coil, the cement is cured, as by heating, until it is hard, so that the coil forms a self-supporting rectangular structure of the required rigidity and a minimum mass.

As shown in Figs. 4, 5, 11 and 12, the upper and lower transverse side 39 of the coil 31 are each provided with a rigid backing member 84, 85, respectively, arranged to form a socket for detachable interconnection and locking engagement with the inner anchoring element 82 of the two suspension members 51. The coil with the two socket members 84, 85 is shown greatly enlarged in Figs. 11 and 12. Each socket member 84, 85 is composed of a relatively rigid saddle-like channel-shaped member 86 embracing the inner side of the transverse coil side 39 and provided with two outwardly extending side arms having bent-over clamping lugs 87 which hold clamped to the channel-shaped saddle elements 86 an upper socket element 88 and a lower socket element 89, respectively, so as to form therewith substantially unitary socket member structures.

It should be noted that the two rigid backing or socket members underly only the inner surface of the transverse coil side, taking up all axial tension forces, and transmitting them to operative axially-parallel sides of the coil 31, the cross-section of the coil turns being sufficient to withstand the relatively large axial tension forces to which the coil and its bifilar suspension members are subjected.

As shown in detail in Figs. 11, 12, the saddle-like backing members 84, 85 and their socket elements 88, 89 are shown formed of sheet metal. The central portions of the socket elements 88, 89 are provided with central seating openings 91 so as to receive the elongated narrow portion of the inner anchoring elements 82 of each suspension member which has a wider shoulder portion arranged to be engaged and retained by the edges of the socket plate openings 91. A slit 91—1 extending from the central seating opening 91 of each seating element 88, 89 to the side edge thereof provides a passage through which the inner end of each suspension member 51 adjoining the inner anchoring element 82 may be brought inwardly into the socket seat opening 91 for establishing a detachable interconnection between the inner anchoring element 82 of the two suspension members 51 with the corresponding socket plate elements 88, 89 of the two socket members 84, 85 respectively.

The socket plate member 88 of the upper socket member 84 has a forwardly projecting portion 88—1 on which the hollow pointer element 45 is mounted and a rearward projection 88—2 provided with two arms 88—3 serving to counterbalance the mass of the pointer structure 45. The mass of the counterbalancing elements 88—2, 88—3 is made somewhat smaller than the mass of the pointer element structure 45, 88—1, so that an additional adjustable mass element may be added thereto for accurately adjusting the mass of the counterbalancing element of the pointer structure. The additional adjustable mass elements of the counterbalancing structure may be formed of small sections of one or more turns of very fine wire wound on or slipped over the counterbalancing arms 88—3.

As indicated in Figs. 4, 5, 11, and 12, the channel-shaped saddle elements of each socket member 84, 85 are made of very light metal, such as aluminum and may be provided with perforated cut-out surface regions as indicated by the openings 86—1, so as to reduce their mass and keep at a minimum the total mass of the moving coil structure. The central portions of the saddle-like sheet elements 86 extending along the inner side of the coil sides may be cemented thereto so that the saddle members with the coil form an integral coil structure.

According to the invention, the two channel-shaped saddle-like sheet elements 84, 85 of the socket members are placed on the mandrel on which the coil is wound, whereupon the coil is wound around the mandrel and the saddle-shaped sheet elements 84, 85, layers of cement being applied to the surface of the saddle elements before the first layer is wound thereon, and coatings of cement being applied over each layer of the coil as the coil winding process proceeds. The saddle elements, although adding very little mass to the coil, are very effective in transmitting the suspension forces to the two axially parallel operative sides of the coil.

As shown in Figs. 4 and 5, the adjusting collars 74 of each suspension head 71, 72 is provided with threaded aligning surfaces engaging corresponding threads formed on the inner aligning surfaces of the tubular aligning member 61 engaged thereby, so that by rotating the adjusting collar 74 of one of the two suspension heads 71, 72, the two suspension heads 71, 72 with their two cantilever spring members 76 may be coaxially adjusted and set to maintain the two coil suspension members 51 at the desired relatively large tension. This simple tension setting also enables fine adjustment of the full scale sensitivity of the instrument, thus eliminating laborious adjustment of the sensitivity by the use of shunt resistances or magnetic shunts.

Each adjusting collar 74 is provided along its exposed exterior cylindrical surface with axially extending longitudinal grooves 74—1 to facilitate turning of the collar and serving also for establishing locking interengagement of the adjusting collar with a latch portion of a spring finger, not shown, which may be suitably affixed, as by a screw, to a portion of the adjacent mounting collar 62, 63 respectively. Each adjusting collar 74 is shown arranged to be retained on its suspension head 71, 72, respectively, by a split generally dome-shaped circular leaf spring 74—2 of spring metal, which is snapped into a notch formed on the inwardly projecting hollow end of the respective suspension heads 71, 72.

Each suspension head 71, 72 may be rotated relatively to its adjusting collar 74 without disturbing it in its axially adjusted position so as to enable adjustment of the zero position of the coil 31 and of its pointer 45. The wide hollow end space of each suspension head 71, 72 is shown enclosed by a circular plug member 71—4 of electrically insulating material held suitably affixed to the suspension head, as by two screws 71—5.

As shown in Figs. 2 and 4, the central portion of the aligning sleeve member 61 of the coil suspension structure to which the central magnetic core member 37 is secured has cut away its side and front wall portions along which the central core 37 forms with the facing pole surfaces of the pole members 36 the arcuate magnet gaps 33 within which the sides of the coil 31 swing. The upper portion of the aligning sleeve member 61 of the coil suspension structure is provided with a transversely extending front window 61—4 and a rear window 61—6 to provide space within which the forwardly and rearwardly projecting parts of the pointer structure 88—1, 88—2 are free to swing over the range corresponding to the coil deflection.

In accordance with the invention, the aligning sleeve member 61 is combined with the central magnetic core element 37 of the magnetic field structure as well as with the elements of the coil suspension heads 71, 72 and with the coil suspension into a self-supporting detachable coil movement unit which may be readily removed from and replaced in its proper position relatively to the other elements of the field structure without disturbing the general cooperative relationship of the various elements of the measuring instrument. In the measuring instrument shown in Figs. 1 to 6, this is accomplished by providing the suspension aligning sleeve member 61 with an exterior cylindrical aligning surface shaped for interfitting engagement with the inwardly facing cylindrical surfaces of the two aligning collars 62, 63 through which the aligning member 61 is interconnected with the pole pieces 36 of the magnetic field structure.

As shown in Figs. 5 and 6, the upper aligning collar 62 is provided with a flange 62—1 shaped to interfit with a suitable aligning surface of the two pole pieces 36 to which it is suitably affixed, as by screws 62—2. The other aligning collar is likewise provided with a flange 63—1 having an aligning surface shaped to interfit with corresponding aligning surfaces formed on the facing surfaces of the two pole pieces 36 to which it is clamped as by screws 63—2. As indicated in Figs. 4 and 5, the elements of the lower suspension head 72, including its adjusting collar 74, have a width of sufficiently small dimensions so that the self-supporting detachable coil movement and suspension assembly, held properly positioned and aligned by the substantially rigid aligning member 61, may be readily removed and replaced in its operative position within the field structure by a longitudinal sliding motion imparted to the tubular aligning member 61 along the inner cylindrical aligning surfaces of its two aligning collars 62, 63 which are secured to the cooperating portions of the field structure.

As shown in Figs. 1, 4, 5 and 6, the upper aligning collar 62 is provided at its front and rear sides with transversely extending window openings 62—4, 62—6 which are sufficiently wide in lateral direction as to permit the forwardly and rearwardly projecting portions 88—1, 88—2 of the pointer structure 45 to swing over the required deflection range, slots 62—5, 62—7 extending upwardly from each window opening 62—4, 62—6 respectively, to the upper edge of the aligning collar 62 providing a passage for the pointer structure when the unitary coil suspension movement with its aligning support 61 is slidably withdrawn in its upward direction from or inserted into its operative aligned position within the cylindrical aligning space of the aligning collars 62, 63 of the field structure.

Suitable locking means are provided for detachably locking and retaining the unitary self-supporting coil suspension movement with its aligning support 61 within the magnetic field structure. In the arrangement shown, the locking means are formed by a lock screw 62—8 threadedly mounted in the side wall of the upper aligning collar 62 of the magnetic field structure and engaging a suitable aligning opening in the aligning support 61 of the removable coil movement and suspension structure.

According to another phase of the invention, the moving coil 31 of the measuring instrument is made of a plurality of coil or winding sections and the suspension members which hold the coil in its operative position are arranged to serve as connecting leads to the different sections of the coils, thus making it possible to use such measuring instrument for simultaneously measuring the interaction of two different currents or for providing an instrument having different ranges of sensitivity without requiring special shunts, or for generally similar purposes.

As indicated diagrammatically in Fig. 9, the moving coil 31 may have two equal winding sections, namely, a winding section 31—1 having two end leads 31—2 of opposite polarity, and a winding section 31—3 having two end leads 31—4 of opposite polarity so that the instrument may be used as a differential measuring instrument.

Another form of multi-section coil arrangement is indicated diagrammatically in Fig. 10. The moving coil 31 has a plurality of intermediate taps 31—5, 31—6 extending from intermediate portions of the coil winding so that in conjunction with the end leads 31—2, 31—4 of the coil, the instrument may be used as a multi-range measuring instrument.

The suspension elements 53, 54 of each of the suspension members 51 of such multi-section coil 31 which hold it in its operative position and serve as its swinging support, are made of distinct conducting elements which are insulated from each other and are arranged to serve as connections to the different sections of the coil. The two bead anchor members 81, 82 provided at the opposite ends of each suspension member 51 are arranged to form insulating supports for the two ends of each conducting suspension element 53, 54.

As indicated in Figs. 4, 5 and 13, the hollow interior spaces 71—2, 72—2 of the two metallic bead anchors 81, 82 respectively, of each suspension member, are filled with an insulating cement in which the opposite ends of each pair of suspension filaments 53, 54 are embedded and the hardened cement holds them insulatingly affixed to their bead anchor sleeves 81, 82.

The two hollow metallic bead elements 81, 82 have their inner surfaces roughened or threaded to provide interlocking bond between them and the solidized rigid cement body filling their interiors and holding them insulatingly affixed therein.

The outer ends of the two conducting suspension wires 53, 54 have tail portions extending beyond the outer anchor 81 through a central hole of the insulating plug 71—4 and are connected, as by soldering, to the solder lugs of two terminal posts or screws 71—6 of opposite polarity affixed to the exposed side of the insulating plug 71—4. The inner ends of the two conducting suspension filaments 53, 54 of each suspension member have similar tail portions extending beyond the inner anchor sleeve 82 which are connected to two terminal soldering lugs 86—2 of opposite polarity which are affixed to the adjacent transverse side of the moving coil. As shown in Figs. 4, 5, 11 and 12, each soldering lug 86—2 is made of a metal strip bent into channel-shape and inserted into two slits of an insulating strip 86—3 which, together with an underlying similar insulating strip 86—4, are placed over the exterior of the transverse coil side portion extending between two side arms of the sheet element 86 of the socket members 84, 85, the several sheet elements being suitably cemented to each other and to the underlying coil side.

According to the invention, galvanometer measuring instruments having suspension movements of the type described above may be made to operate with extremely high sensitivity and great accuracy without frequent adjustment, by making the distance between the adjacent suspension elements, such as suspension elements 53, 54 of each suspension member of the order of about .004 to .002 inch. If the distance between the suspension elements, such as suspension elements 53, 54 of a bifilary suspension member of the type described above is of the order of .004 to .002 inch, the torque due to bifilar action is about 60% to 90% of the total torque exerted by the suspension member, depending on the modulous of rigidity of the metal used for the suspension elements, and the additional torque component due to the tortion to which the suspension wires are subjected is so low as to substantially eliminate any fatigue effects of the wires, thereby assuring a positive zero position of the instrument and reliable accurate performance without adjustment during long periods of use.

In the bifilary suspension movement of the invention, the cantilever springs supply a constant force in the axial direction, and since the springs are of the cantilever type, they may be made of a relatively large cross-section. As a result, they may be made relatively rugged, they are easy to handle, and their tensioning forces are not affected by small differences in their structural dimensions. Accordingly, instruments of the invention may be made to operate with greater accuracy, without requiring too high precision in the manufacture of the instrument.

The cantilever spring arrangement of the suspension movement of the invention is extremely rigid in radial direction, and it is flexible only in axial direction. This enables ready adjustment of the tensioning forces and fine full-scale adjustment of the movement.

In the past, it has been considered impossible to make a practical galvanometer instrument of high sensitivity for operation with an air gap field density exceeding about three to five thousand gausses, because it was found that the magnetic impurities of the moving elements of the coil, such as the copper wire and its insulation, increases proportional to the field density in the air gap and that for a very sensitive instrument, the torque due to magnetic impurities is bound to be comparable to the small elastic restoring torque which controls the motion of the coil.

In accordance with another phase of the invention, a galvanometer instrument of the foregoing type overcomes these difficulties and is able to operate effectively with a gap field density of as much as ten thousand gausses or more by making the arcuate range of the gap region 33 between the pole faces of the magnetic core structure extend over an arc which is about fifty percent greater than the maximum deflection range of the coil so that the elements of the coil always move in a uniform field. With such arrangement, the magnetic field may be kept uniform in the limited central region of the arcuate gap range 33 over which the coil 31 is deflected, and since magnetic impurities of the moving coil do not produce any forces or torque in a uniform field, their effect on the sensitivity of the instrument is eliminated. As a result, such galvanometer instrument of the invention is able to operate with a very high sensitivity under the control of a very elastic restoring torque.

In the coil suspension system of the galvanometers of the invention the two bifilary suspension members 51 provide the sole frictionless pivot support for the coil and also the elastic restoring action which returns the coil to its zero position. All energy due to the deflection of the coil is stored in relatively large tension springs and not in the bifilar suspension members. This assures high accuracy and permanence of the zero position of the pointer. The coil will readily deflect out of its normal position when subjected to sudden shocks and large extraneous forces and the coil is stopped by the core without introducing any excessive strain into the suspension structure. As a result, the galvanometer of the invention is very rugged and it will not get out of order or lose its calibrations when subjected to rough handling.

Without in any way limiting its scope and to enable ready practice of the invention, there are given below the structural data of several practical galvanometer instruments of the invention which proved highly satisfactory in actual use.

*Panel type galvanometer with case 3 inches in diameter*

Coil weight—about .5 gram
Coil height—(between suspension supports (.7 inch
Coil thickness—.025 inch
Coil cross-section—.002 inch square
Length of each suspension member—.7 inch
Axial tension forces—about 100 grams
Air gap of magnetic structure—about .040 inch
Induction B in air gap—10 to 14 kilogauss
Sensitivity with coil of 2000 turns—2 to 10 microamperes full scale, depending on the length of scale and on the use of mechanical or light pointer
Maximum axially transverse deflection due to coil weight—only about .0015 inch which is less than for mechanical coil pivots Such instrument designed for aircraft, and with a mechanical pointer, operated with a sensitivity of 5 to 10 microamperes on a 2½ inch scale and an energy consumption of about $3 \times 10^{-8}$ watts.

*Laboratory galvanometer with case 6 inches in diameter*

Coil weight—.9 gram
Coil height—(between suspension supports) 1.125 inches
Coil thickness—.025 inch
Coil cross-section—.003 inch square
Lenth of each suspension member—1.125 inches
Axial tension forces—about 125 grams to 150 grams
Air gap of magnetic structure—.050 inch
Induction in air gap—10 to 14 kilogauss
Sensitivity with coil of 2000 turns—1 microampere on a 6.5 inch scale with light pointer, and .2 microamperes on a 6.5 inch scale with mechanical pointer
Energy consumption—1 microampere instrument $3 \times 10^{-9}$ to $4 \times 10^{-9}$ watts
Maximum axially transverse deflection due to coil weight—only about .004 inch In all instruments, the coil was made of copper wire. The suspension filament was a platinum alloy wire .001 inch thick.

A six inch laboratory instrument—with two microamperes full-scale deflection and a coil resistance of 2000 ohms—has a full-scale deflection period of slightly over one second.

A six inch laboratory instrument—with a sectional coil arranged to operate with three sensitivity ranges of 2.4 microamperes, 8 microamperes and 24 microamperes full-scale deflection, and a coil resistance of 1000 ohms at the 2.4 microamperes setting—has a full-scale deflection period of about ¾ seconds.

According to a still further phase of the invention, the two adjacent wire-like elements 53, 54 of such coil suspension member 51, are formed of a ribbon-like member of the type shown in Fig. 7. The suspension member 51 has two border sections 53—1, 54—1 performing the functions of the two closely-spaced wire-like elements of such suspension member and a mechanically-weak web-like section 51—1 of such thin cross-section that when such suspension member 51 is subjected to a twisting motion, substantially all strain is taken up by the wire-like border regions 53—1, 54—1 of the suspension member, the central web region 51—1 being readily deformed substantially without strain. Such ribbon-like suspension member may be made by subjecting a wire to a rolling operation between suitable rolling members.

In addition, the web section 51—1 of such suspension member is further weakened by providing it with perforations so that the two border sections 53—1, 54—1 of such suspension member are interconnected only by thin transverse bridges separating the perforations 51—2 of the thin web element 51—1.

According to another phase of the invention, one or more of the cantilever springs are made of bimetallic metal in order to provide for automatic compensation for the effect of temperature variations on the different parameters controlling the operation of the instrument, such as the permanent magnet, coil resistance and elongation of the suspension members. In the coil suspension arrangement of the invention, a large part of the restoring forces controlling the deflection of the coil is supplied by the deformation of the flat spiral cantilever spring suspension, as distinguished from ribbon-type suspension instruments in which the twisting deformation of the ribbon provides the restoring forces which control the sensitivity of the instrument. By utilizing a coil suspension movement in which the tension is provided by cantilever springs, the coil is free to deflect under sudden shock and to move out of its central position against the adjacent parts of the instrument structure without exposing any elements to excessive strains.

According to another phase of the invention, measuring instruments of the type described above, including the field structure and the coil suspension cooperating therewith, are so combined with the support that external vibratory forces, for instance, vibratory forces exerted by the vibrations of moving aircraft structures, do not materially affect the operation of the instrument. Figs. 1 to 3 illustrate one form of such instrument.

The field structure of the instrument with the coil suspension mounted thereon in the manner described above, is shown held positioned within a circular metal casing 101 by a solid junction member 102 of substantial cross section formed of a rubber-like material which exhibits good vibration damping characteristics. The rubber-like junction member 102 is of such cross-section and of such stiffness in relation to the mass of the instrument movement carried thereby that the system formed by the mass of the movement and the stiffness of the junction member 102 has a resonant frequency below the range of frequencies of the disturbing vibrations to which the instrument is subjected while in operation. Thus, in the case of an aircraft which is subjected to disturbing vibrations of a frequency between 1500 to 3000 cycles per minute, the system formed by the mass of the measuring instrument carried by the rubber-like junction member 102 should be around 1000 cycles in order to render the operation of the instrument substantially immune to the external disturbing vibrations.

In the specific form of instrument shown in Figs. 1 to 3, the junction member 102 is made in the form of a ring, the exterior of which just fits against the inner cylindrical walls of the circular casing 101. The mounting block 38 of the field structure assembly is shown provided with a seating groove 38—1 engaging and retaining one peripheral portion of the rubber-like supporting ring 102. Two additional peripheral portions of the supporting ring 102 are held in their proper position in relation to the field structure of the movement by pairs of overlapping metallic retainer lugs 36—4 held clamped to the upper and lower sides of the pole pieces 36 by screws 36—5 in the manner indicated in Fig. 3A. The suspension ring 102 is also secured to the side walls of the instrument casing 101 by two channel-shaped clamping members 104 engaging and overlying the inner side of diametrically opposite portions of the ring-like supporting member 102 and held clamped to the facing casing wall portions by two screws 105, in the manner indicated in Figs. 2, 3 and 3B.

Figs. 14 to 16 illustrate a modified form of instrument of the invention in which the coil suspension is combined with thermostatic means operative to compensate for the effect of extreme temperature variations on the operation of the instrument. The outer end of the upper suspension member 51 is mounted on a modified form of suspension head 2—71 which is connected through a spiral bimetallic thermostatically operating spring member 111 to a mounting member 112 which is held connected to a modified form of adjusting collar 2—74 which is held in its adjustable position within the aligning sleeve member 61, in the same manner as described in connection with Figs. 1 to 6.

The inner end of the spiral bimetallic spring 111 is bent and held affixed within a slot of the lower end of the upper suspension head 2—71 and the outer end of the bimetallic spring 111 is held affixed to a mounting ring 114 which is held affixed to the connector 112 which connects it to the adjusting collar 2—74. The adjusting collar is provided with a circular row of holes 115 arranged to establish releasable interlocking engagement with a locking projection 116 of a locking spring 117 held affixed, as by a screw, to the exterior of the collar member 62 so as to permit setting of the adjusting collar in different adjusted positions in which the suspension is maintained at the proper tension. Such bimetallic spring 111 may be designed to form a good and positive axial support for the suspension head, while at the same time assuring that changes in the zero position of the pointer due to variations of the temperature are automatically compensated by imparting to the suspension head 2—71 an angular motion in its axially aligned central position.

In Figs. 17 to 20 is shown a modified form of instrument of the invention equipped with thermostatic compensation for variations of the parameters due to wide range variations of the temperature under which it has to operate. The lower suspension head 2—72 has connected to an exposed exterior portion thereof the inner end of a spiral bimetallic thermostatic member 121, the other end of which is connected to a post 122 carried by an adjusting arm 123 pivotally connected through a pivot 124 to a mounting bracket 125 suitably affixed to a mounting member 2—40 secured to the magnetic field structure of the instrument. The operation of the thermostat may be adjusted, for instance, by means of an eccenter pin 126 engaging a slot in the adjusting arm 123 and carried by a nut member engaging a shoulder screw 128 seated in an end wall of the instrument so that by turning the head of the screw 128, the initial setting of the thermostat and the zero position of the pointer may be adjusted.

In instruments of the type described in connection with Figs. 14 to 16 and 17 to 20, variations of the temperature will cause the spiral thermostatic element 121 to be deformed in one direction or the other, thereby imparting to a suspension head connected thereto a motion which compensates for variations of the parameters which determine the zero position of the instrument so as to keep the pointer in the zero position notwithstanding variations of the temperature. In each of the instruments, the initial zero position may be adjusted and set in the manner described above.

As shown in Fig. 17, antifriction means are provided for reducing or eliminating frictional forces resisting rotational movement imparted to the lower suspension head 2—72 when it is turned in one direction or the other by the operation of the thermostatic element 121. The antifriction means may be formed by a roller bearing structure or, as shown, by an antifriction bearing lining, such as an oil impregnated bearing lining 4—74 held along the inner surface of the adjusting collar 5—74 of the lower suspension head of the instrument shown in Fig. 17.

In all of the forms of the instrument described above in connection with Figs. 1 to 20, the upper side of the instrument casing 101 is enclosed by a cover 131 provided with a window opening 132 to the underside of which is held clamped a transparent pane 133 of transparent material, such as glass, for exposing therethrough the pointer 45 and the underlying scale 44 of the scale member 43. The cover wall 131 is also shown provided with another opening 134 bordered by a flange 135 for receiving therein the upwardly projecting part of the coil suspension structure including the upper suspension head 71. The opening 134 is normally enclosed by a cover member 136 having a cylindrical border arranged to be seated and clampingly engage the flange 135 of the cover opening 134. This arrangement makes it possible to adjust the zero position of the instrument by simply removing the cover member 136 and turning the upper suspension head 171 to the right or left for bringing the pointer to the zero position in case zero adjustment is necessary.

In Figs. 21 and 22 is shown a modified form of measuring instrument of the general type described in connection with Figs. 1 to 6 which utilizes in lieu of a mechanical pointer a light beam pointer. The instrument of Figs. 21 and 22 has a magnetic field structure and a movable coil 31 carried by a suspension structure of the same general type as described in connection with Figs. 1 to 6, and including an upper suspension head 6—71 rotatably held by the adjusting collar 6—74 within the sleeve member 6—61 similar in construction to the corresponding elements of the instrument described in connection Figs. 1 to 6. However, in the instrument of Figs. 21 and 22, the upper socket member 6—84 of the coil does not carry a mechanical pointer, but only a light upright strip 141 just sufficient to serve as a support for a small reflecting mirror 142.

Within the instrument housing 140 is mounted a light source, shown in the form of a lamp 143 which—in conjunction with projection means shown formed of a projection tube 144 provided at one end with a hairline slit member 145 and at the other end with a projection lens 146—is arranged so as to project the image of the hairline on the mirror 142 in such manner that the image of the hairline is reflected by the mirror 142 on a generally conical upwardly-facing scale surface member 6—43. With such arrangement, a deflection imparted to the coil 31 by current passing therethrough will produce a corresponding deflection of the reflected image of the hairline pointer along the scale 6—43, in a manner analogous to the deflection of the mechanical pointer of the coil of the measuring instrument shown in Figs. 1 to 6.

In Figs. 21 to 24, there is also shown means for adjusting the zero position of the instrument from the exterior of the instrument housing 140. As shown in Fig. 22, the cover wall 151 of the instrument casing is provided with an opening 152 to the underside of which is affixed a pane 153 of transparent material, such as glass, through which the upwardly facing scale of the scale member 6—43 provided with a scale, not shown, and the deflection of the light pointer thereon, may be observed. The cover wall 151 is also provided with an additional circular opening for receiving therein the upwardly projecting end of the coil suspension structure including the upper coil suspension head 6—71.

The cover opening through which the upper suspension head 6—71 projects is enclosed by a circular cover member 154 provided at its lower end with a circular flange 155 rotatably held within the border region of the opening of the cover wall 151, as by an arcuate spring washer member 156 held clamped by screws 157 to the inwardly facing border surface of the cover 154. An inwardly facing peripheral portion of the border flange 155 of the cover member is provided with an inwardly opening notch 158 for receiving therein a pin 159 projecting from the exterior wall surface of the suspension head 6—71 so that by turning the cover member 154, the upper suspension head 6—71 will be turned therewith in the manner indicated in connection with Figs. 23 and 24. A gear segment 161 is secured to an inwardly facing peripheral portion of the cover flange 155, and the gears of gear segment 161 engage the teeth of a pinion 162 held affixed to the inner end of a shoulder screw 165 mounted in the cover wall 151 so that by turning the head of screw 165 a proper angular turning motion may be imparted to the circular cover element 154 and therethrough to the upper suspension head 6—71 for adjusting its zero position.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In an electrical measuring device having a magnetic structure including an intermediate core element and an additional core structure separated from the opposite sides of the said core element by two generally circular gap regions aligned along the opposite sides of the core element and operative to maintain in said two gap regions a unidirectional magnetic field: a rotatable coil structure comprising a substantial number of coil turns surrounding said core element and having opposite elongated operative coil sides for producing a coil deflection around a coil axis of rotation corresponding to and indicating the magnitude of electric current therethrough; a suspension structure including two spaced support elements and two elongated bifilary members axially aligned along said axis and connected with their inner ends to the other opposite outer transverse coil sides of said coil structure, and with their outer ends to said two support elements to operate as the sole rotatable supporting connection carrying said coil structure in a floating operative position and restraining its rotation; each of said bifilary members being at most about 1.5 inch long and having two substantially parallel elastically deformable suspension filaments spaced from each other by at most about 0.015 inch for exerting on said coil structure torsional restoring forces restraining rotation of said coil structure, the outer and inner regions of the two filaments of each of said bifilary members having co-axial elongated end anchor portions united in their spaced relation into integral outer and inner anchor elements through which said bifilary suspension member is mechanically joined to the parts to which it is connected, and the two filaments of each bifilary suspension member being held in said anchor elements on opposite sides of said coil axis; said suspension structure including a tension structure comprising coaxial spring elements elastically deformable in a direction parallel to said coil axis and substantially rigid in a direction generally transverse to said coil axis and connected coaxially to the outer anchor elements of said two bifilary suspension members for substantially preventing transverse displacement of the two axially aligned suspension members and for holding said coil structure restrained in its floating operating condition out of engagements with any portions of the core structure in substantially all angular positions of said coil axis.

2. In an electrical measuring device having a magnetic structure including an intermediate core element and an additional core structure separated from the opposite sides of said core element by two generally circular gap regions aligned along the opposite sides of the core elements and operative to maintain in said two gap regions a unidirectional magnetic field: a rotatable coil structure comprising a substantial number of coil turns surrounding said core element, and having opposite elongated operative coil sides for producing a coil deflection around a coil axis corresponding to and indicating the magnitude of electric current through said coil structure; a suspension structure including two spaced support elements and two elongated bifilary members axially aligned along said coil axis and connected with their inner ends to the other opposite outer transverse coil sides of said coil structure and with their outer ends to said two support elements for operation as a sole rotatable supporting connection carrying said coil structure in a floating operative position and restraining its rotation; each of the bifilary members having two substantially parallel elastically deformable suspension filaments spaced from each other for exerting on said coil structure torsional restoring forces restraining rotation of said coil structure, the outer and inner regions of the two filaments of each of said bifilary members having coaxial elongated end anchor portions insulatingly united in their spaced relation into integral outer and inner anchor elements through which said bifilary suspension member is mechanically joined to the parts to which it is connected and the two filaments of each bifilary suspension member being held by said end anchor elements on opposite sides of said coil axis; said suspension structure including a tension structure comprising coaxial spring elements elastically deformable in a direction parallel to the coil axis and substantially rigid in a direction generally transverse to said coil axis and connected coaxially to the coaxial outer anchor elements of said two bifilary suspension members for substantially preventing transverse displacement of said two axially aligned suspension members and for holding said coil structure restrained in its floating operating condition out of engagement with any portions of the core structure in substantially all angular positions of said coil axis.

3. In a measuring instrument having a magnetic structure including an intermediate core element and an additional core structure separated from the opposite sides of said core element by two generally circular gap regions aligned along the opposite sides of the core elements and operative to maintain in said two gap regions a unidirectional magnetic field: a rotatable coil structure comprising a substantial number of coil turns surrounding said core element, and having opposite elongated operative coil sides for producing a coil deflection around a coil axis corresponding to and indicating the magnitude of electric current through said coil structure; a suspension structure including two spaced support elements and two elongated bifilary members axially aligned along said coil axis and connected with their inner ends to the other opposite outer transverse coil sides of said coil structure and with their outer ends to said two support elements for operation as a sole rotatable supporting connection carrying said coil structure in a floating operative position and restraining its rotation; each of the bifilary members having two substantially parallel elastically deformable suspension filaments spaced from each other for exerting on said coil structure torsional restoring forces restraining rotation of said coil structure, the outer and inner regions of the two filaments of each of said bifilary members having coaxial elongated end anchor portions insulatingly united in their spaced relation into integral outer and inner anchor elements through which said bifilary suspension member is mechanically joined to the parts to which it is connected and the two filaments of each bifilary suspension member being held by said end anchor elements on opposite sides of said coil axis; said suspension structure including a tension structure comprising coaxial spring elements elastically deformable in a direction parallel to the coil axis and substantially rigid in a direction generally transverse to said coil axis and connected coaxially to the coaxial outer anchor elements of said two bifilary suspension members for substantially preventing transverse displacement of said two axially aligned suspension members and for holding said coil structure restrained in its floating operating condition out of engagement with any portions of the core structure in substantially all angular positions of said coil axis each of the anchor elements of each bifilary member being held detachably joined in its operative position by said tension forces to the support part to which it is connected and being relatively freely separable from said support part in the absence of said tension forces.

4. In a measuring instrument having a magnetic structure including an intermediate core element and an additional core structure separated from the opposite sides of said core element by two generally circular gap regions aligned along the opposite sides of the core elements and operative to maintain in said two gap regions a unidirectional magnetic field: a rotatable coil structure comprising a substantial number of coil turns surrounding said core element, and having opposite elongated operative coil sides for producing a coil deflection around a coil axis corresponding to and indicating the magnitude of electric current through said coil structure; a suspension structure including two spaced support elements and two elongated bifilary members axially aligned along said coil axis and connected with their inner ends to the other opposite outer transverse coil sides of said coil structure and with their outer ends to said two support elements for operation as a sole rotatable supporting connection carrying said coil structure in a floating operative position and restraining its rotation; each of the bifilary members having two substantially parallel elastically deformable suspension filaments spaced from each other for exerting on said coil structure torsional restoring forces restraining rotation of said coil structure, the outer and inner regions of the two filaments of each of said bifilary members having coaxial elongated end anchor portions insulatingly united in their spaced relation into integral outer and inner anchor elements through which said bifilary suspension member is mechanically joined to the parts to which it is connected and the two filaments of each bifilary suspension member being held by said end anchor elements on opposite sides of said coil axis; said suspension structure including a tension structure comprising coaxial spring elements elastically deformable in a direction parallel to the coil axis and substantially rigid in a direction generally transverse to said coil axis and connected coaxially to the coaxial outer anchor elements of said two bifilary suspension members for substantially preventing transverse displacement of said two axially aligned suspension members and for holding said coil structure restrained in its floating operating condition out of engagement with any portions of the core structure in substantially all angular positions of said coil axis each of the anchor elements of each bifilary member being held detachably joined in its operative position by said tension forces to the support part to which it is connected and being relatively freely separable from said support part and separable therefrom in the absence of said tension forces; the two anchor elements of each bifilary member constituting electrically insulating supports insulating said filaments from the adjoining parts of the suspension structure, said filaments constituting electrical circuit connections from different portions of said coil structure to an external circuit.

5. In a measuring instrument having a magnetic structure including an intermediate core element and an additional core structure separated from the opposite sides of said core element by two generally circular gap regions aligned along the opposite sides of the core elements and operative to maintain in said two gap regions a unidirectional magnetic field: a rotatable coil structure comprising a substantial number of coil turns surrounding said core element, and having opposite elongated operative coil sides for producing a coil deflection around a coil axis corresponding to and indicating the magnitude of electric current through said coil structure; a suspension structure including two spaced support elements and two elongated bifilary members axially aligned along said coil axis and connected with their inner ends to the other opposite outer transverse coil sides of said coil structure and with their outer ends to said two support elements for operation as a sole rotatable supporting connection carrying said coil structure in a floating operative position and restraining its rotation; each of the bifilary members having two substantially parallel elastically deformable suspension filaments spaced from each other for exerting on said coil structure torsional restoring forces restraining rotation of said coil structure, the outer and inner regions of the two filaments of each of said bifilary members having coaxial elongated end anchor portions insulatingly united in their spaced relation into integral outer and inner anchor elements through which said bifilary suspension member is mechanically joined to the parts to which it is connected and the two filaments of each bifilary suspension member being held by said end anchor elements on opposite sides of said coil axis; said suspension structure including a tension structure comprising coaxial spring elements elastically deformable in a direction parallel to the coil axis and substantially rigid in a direction generally transverse to said coil axis and connected coaxially to the coaxial outer anchor elements of said two bifilary suspension members for substantially preventing transverse displacement of said two axially aligned suspension members and for holding said coil structure restrained in its floating operating condition out of engagement with any portions of the core structure in substantially all angular positions of said coil axis, said tension structure comprising a generally circular self-supporting spring unit coaxially aligned with said coil structure and detachably held by adjacent support elements of the suspension structure, said spring unit comprising at least one spirally shaped spring element of sheet metal with the surface of the sheet metal extending substantially transversely to the coil axis.

6. In a measuring instrument having a magnetic structure including an intermediate core element and an additional core structure separated from the opposite sides of said core element by two generally circular gap regions aligned along the opposite sides of the core elements and operative to maintain in said two gap regions a unidirectional magnetic field: a rotatable coil structure comprising a substantial number of coil turns surrounding said core element, and having opposite elongated operative coil sides for producing a coil deflection around a coil axis corresponding to and indicating the magnitude of electric current through said coil structure; a suspension structure including two spaced support elements and two elongated bifilary members axially aligned along said coil axis and connected with their inner ends to the other opposite outer transverse coil sides of said coil structure and with their outer ends to said two support elements for operation as a sole rotatable supporting connection carrying said coil structure in a floating operative position and restraining its rotation; each of the bifilary members having two substantially parallel elastically deformable suspension filaments spaced from each other for exerting on said coil structure torsional restoring forces restraining rotation of said coil structure, the outer and inner regions of the two filaments of each of said bifilary members having coaxial elongated end anchor portions insulatingly united in their spaced relation into integral outer and inner anchor elements through which said bifilary suspension member is mechanically joined to the parts to which it is connected and the two filaments of each bifilary suspension member being held by said end anchor elements on opposite sides of said coil axis; said suspension structure including a tension structure comprising coaxial spring elements elastically deformable in a direction parallel to the coil axis and substantially rigid in a direction generally transverse to said coil axis and connected coaxially to the coaxial outer anchor elements of said two bifilary suspension members for substantially preventing transverse displacement of said two axially aligned suspension members and for holding said coil structure restrained in its floating operating condition out of engagement with any portions of the core structure in substantially all angular positions of said coil axis, said tension structure comprising a generally circular self-supporting spring unit coaxially aligned with said coil structure and detachably held by adjacent support elements of the suspension structure, said spring unit comprising at least two coaxially positioned spirally shaped spring elements of sheet metal, with the surface of the sheet metal extending substantially transversely to the coil axis, said spring unit comprising at least two similar, coaxially positioned, spirally shaped spring elements of sheet metal.

7. In a measuring instrument as claimed in claim 6, each spring element having an inner end portion to which the outer end of the associated suspension member is connected and a generally loop-shaped outer end portion supporting the spring element in deformable condition.

8. In a measuring instrument as claimed in claim 2, said tension structure comprising two generally circular spring units coaxially aligned with said coil structure and detachably joined to the outer ends of the two bifilary members, respectively, the two spring elements of a spring unit extending spirally in opposite direction, the inner spring end portions of two spring elements of a spring unit constituting parts of a common inner spring junction element through which the spring element is detachably connected to the outer end of the associated suspension member and the outer spring end portions of the two spring elements constituting parts of a common outer spring junction member supporting the two spiral spring elements in deformable condition.

9. In a measuring instrument having a magnetic structure including an intermediate core element and an additional core structure separated from the opposite sides of said core element by two generally circular gap regions aligned along the opposite sides of the core elements and operative to maintain in said two gap regions a unidirectional magnetic field: a rotatable coil structure comprising a substantial number of coil turns surrounding said core element, and having opposite elongated operative coil sides for producing a coil deflection around a coil axis corresponding to and indicating the magnitude of electric current through said coil structure; a suspension structure including two spaced support elements and two elongated bifilary members axially aligned along said coil axis and connected with their inner ends to the other opposite outer transverse coil sides of said coil structure and with their outer ends to said two support elements for operation as a sole rotatable supporting connection carrying said coil structure in a floating operative position and restraining its rotation; each of the bifilary members having two substantially parallel elastically deformable suspension filaments spaced from each other for exerting on said coil structure torsional restoring forces restraining rotation of said coil structure, the outer and inner regions of the two filaments of each of said bifilary members having coaxial elongated end anchor portions insulatingly united in their spaced relation into integral outer and inner anchor elements through which said bifilary suspension member is mechanically joined to the parts to which it is connected and the two filaments of each bifilary suspension member being held by said end anchor elements on opposite sides of said coil axis; said suspension structure including a tension structure comprising coaxial spring elements elastically deformable in a direction parallel to the coil axis and substantially rigid in a direction generally transverse to said coil axis and connected coaxially to the coaxial outer anchor elements of said two bifilary suspension members for substantially preventing transverse displacement of said two axially aligned suspension members and for holding said coil structure restrained in its floating operating condition out of engagement with any portions of the core structure in substantially all angular positions of said coil axis, a substantially rigid holder member carrying the intermediate core element and all elements of the suspension structure through which the support elements of the suspension structure support the coil structure in its operative position and constituting therewith a self-supporting movement unit, said holder member being detachably joined in its operative position to said additional core structure, and being shaped and arranged to establish the cooperative relation of said coil structure to the magnetic structure when, after detaching, said movement unit is replaced in its operative position relatively thereto.

10. In a measuring instrument as claimed in claim 9, said movement unit and the additional magnetic structure having cooperating generally circular coaxially aligning surfaces along which they are positively moved and brought into cooperative relation when the movement unit is placed in its operative position relative to the magnetic structure.

11. In a measuring instrument having a magnetic structure including an intermediate core element and an additional core structure separated from the opposite sides of said core element by two generally circular gap regions aligned along the opposite sides of the core elements and operative to maintain in said two gap regions a unidirectional magnetic field: a rotatable coil structure comprising a substantial number of coil turns surrounding said core element, and having opposite elongated operative coil sides for producing a coil deflection around a coil axis corresponding to and indicating the magnitude of electric current through said coil structure; a suspension structure including two spaced support elements and two elongated bifilary members axially aligned along said coil axis and connected with their inner ends to the other opposite outer transverse coil sides of said coil structure and with their outer ends to said two support elements for operation as a sole rotatable supporting connection carrying said coil structure in a floating operative position and restraining its rotation; each of the bifilary members having two substantially parallel elastically deformable suspension filaments spaced from each other for exerting on said coil structure torsional restoring forces restraining rotation of said coil structure, the outer and inner regions of the two filaments of each of said bifilary members having coaxial elongated end anchor portions insulatingly united in their spaced relation into integral outer and inner anchor elements through which said bifilary suspension member is mechanically joined to the parts to which it is connected and the two filaments of each bifilary suspension member being held by said end anchor elements on opposite sides of said coil axis; said suspension structure including a tension structure comprising coaxial spring elements elastically deformable in a direction parallel to the coil axis and substantially rigid in a direction generally transverse to said coil axis and connected coaxially to the coaxial outer anchor elements of said two bifilary suspension members for substantially preventing transverse displacement of said two axially aligned suspension members and for holding said coil structure restrained in its floating operating condition out of engagement with any portions of the core structure in substantially all angular positions of said coil axis, said core element and the additional magnetic structure being shaped to provide two arcuate magnetic gap regions through which said coil moves, each gap region extending over an angle of the order of at least threehalves of the angle of the maximum angular deflection of the coil structure corresponding to the maximum scale range so that the operative coil sides are within a magnetic field of substantially uniform intensity over the entire range of full scale coil deflection; said magnetic structure including permanently magnetized core elements for maintaining within each magnetic gap region through which the coil moves in a full scale coil deflection, a substantially uniform unidirectional field having induction of the order of 6000 gauss or more.

12. In a measuring device having a magnetic structure including an intermediate core element and an additional core structure separated from the opposite sides of said core element by two generally circular gap regions aligned along the opposite sides of the core elements and operative to maintain in said two gap regions a unidirectional magnetic field: a rotatable coil structure comprising a substantial number of coil turns surrounding said core element, and having opposite elongated operative coil sides for producing a coil deflection around a coil axis corresponding to and indicating the magnitude of electric current through said coil structure; a suspension structure including two spaced support elements and two elongated bifilary members axially aligned along said coil axis and connected with their inner ends to the other opposite outer transverse coil sides of said coil structure and with their outer ends to said two support elements for operation as a sole rotatable supporting connection carrying said coil structure in a floating operative position and restraining its rotation; each of the bifilary members having two substantially parallel elastically deformable suspension filaments spaced from each other for exerting on said coil structure torsional restoring forces restraining rotation of said coil structure, the outer and inner regions of the two filaments of each of said bifilary members having coaxial elongated end anchor portions insulatingly united in their spaced relation into integral outer and inner anchor elements through which said bifilary suspension member is mechanically joined to the parts to which it is connected and the two filaments of each bifilary suspension member being held by said end anchor elements on opposite sides of said coil axis; said suspension structure including a tension structure comprising coaxial spring elements elastically deformable in a direction parallel to the coil axis and substantially rigid in a direction generally transverse to said coil axis and connected coaxially to the coaxial outer anchor elements of said two bifilary suspension members for substantially preventing transverse displacement of said two axially aligned suspension members and for holding said coil structure restrained in its floating operating condition out of engagement with any portions of the core structure in substantially all angular positions of said coil axis, parts of said suspension structure constituting compensating elements operative in response to changes of the ambient temperature for bringing the coil structure to its calibrated indicating position over a substantial range of variations of the ambient temperature.

13. In a measuring device as claimed in claim 12, said tension structure of the suspension structure operating as said compensating element.

14. In a measuring device as claimed in claim 12, at least one spring element of said tension structure operating as said compensating element.

15. In a measuring device as claimed in claim 12, the two spring elements of at least one spring unit of said tension structure operating as said compensating element.

16. In a measuring device having a magnetic structure including an intermediate core element and an additional core structure separated from the opposite sides of said core element by two generally circular gap regions aligned along the opposite sides of the core elements and operative to maintain in said two gap regions a unidirectional magnetic field; a rotatable coil structure comprising a substantial number of coil turns surrounding said core element, and having opposite elongated operative coil sides for producing a coil deflection around a coil axis corresponding to and indicating the magnitude of electric current through said coil structure; a suspension structure including two spaced support elements and two elongated bifilary members axially aligned along said coil axis and connected with their inner ends to the other opposite outer transverse coil sides of said coil structure and with their outer ends to said two support elements for operation as a sole rotatable supporting connection carrying said coil structure in a floating operative position and restraining its rotation; each of the bifilary members having two substantially parallel elastically deformable suspension filaments spaced from each other for exerting on said coil structure torsional restoring forces restraining rotation of said coil structure, the outer and inner regions of the two filaments of each of said bifilary members having coaxial elongated end anchor portions insulatingly united in their spaced relation into integral outer and inner anchor elements through which said bifilary suspension member is mechanically joined to the parts to which it is connected and the two filaments of each bifilary suspension member being held by said end anchor elements on opposite sides of said coil axis; said suspension structure including a tension structure comprising coaxial spring elements elastically deformable in a direction parallel to the coil axis and substantially rigid in a direction generally transverse to said coil axis and connected coaxially to the coaxial outer anchor elements of said two bifilary suspension members for substantially preventing transverse displacement of said two axially aligned suspension members and for holding said coil structure restrained in its floating operating condition out of engagement with any portions of the core structure in substantially all angular positions of said coil axis, said core element, said coil structure and the cooperating elements of the suspension structure effective in carrying on measuring operations constituting a self-supporting instrument body, and in combination therewith a supporting structure for said instrument body, rubber-like elastic body elements interposed between the instrument body and the supporting structure so that the elastic body elements floatingly carry said instrument body on said supporting structure, said elastic body elements being of a cross-section and stiffness at which they form with the mass of the instrument body a vibrating system having a resonant frequency of about 1000 cycles per second or less.

17. In an electrical measuring device having a magnetic structure including an intermediate core element and an additional core structure separated from the opposite sides of the said core element by two generally circular gap regions aligned along the opposite sides of the core element and operative to maintain in said two gap regions a unidirectional magnetic field; a rotatable coil structure comprising a substantial number of coil turns surrounding said core elements and having opposite elongated coil sides for producing a coil deflection around an axis of rotation of said coil corresponding to an electric current therethrough; a suspension structure including two spaced support elements and two elongated suspension members axially aligned along said axis and connected between the other opposite outer transverse coil sides of said coil structure and said two support elements to operate as the sole rotatable supporting connection carrying said coil structure in a floating operative position and restraining its rotation; said suspension structure including an elastically deformable tension structure connected between each of said two support elements and the outer end of the suspension member connected thereto for subjecting said suspension members and said coil structure to axial tension forces for holding said coil structure restrained in its floating condition out of engagement with any portions of said core structure; parts of said suspension structure constituting compensating elements operative in response to changes of the ambient temperature for bringing the coil structure to its calibrated indicating position over a substantial range of variations of the ambient temperature.

18. In a measuring instrument as claimed in claim 17, said tension structure of the suspension structure operating as said compensating element.

19. In an electrical measuring device having a magnetic structure including an intermediate core element and an additional core structure separated from the opposite sides of the said core element by two generally circular gap regions aligned along the opposite sides of the core element and operative to maintain in said two gap regions a unidirectional magnetic field; a rotatable coil structure comprising a substantial number of coil turns surrounding said core elements and having opposite elongated coil sides for producing a coil deflection around an axis of rotation of said coil corresponding to an electric current therethrough; a suspension structure including two spaced support elements and two elongated suspension members axially aligned along said axis and connected between the other opposite outer transverse coil sides of said coil structure and said two support elements to operate as the sole rotatable supporting connection carrying said coil structure in a floating operative position and restraining its rotation; said suspension structure including an elastically deformable tension structure connected between each of said two support elements and the outer end of the suspension member connected thereto for subjecting said suspension members and said coil structure to axial tension forces for holding said coil structure restrained in its floating condition out of engagement with any portions of said core structure; said core element, said coil structure and the cooperating elements of the suspension structure effective in carrying on measuring operations constituting a self-supporting instrument body, and in combination therewith a supporting structure for said instrument body, rubber-like elastic body elements interposed between the instrument body and the supporting structure so that the elastic body elements floatingly carry said instrument body on said supporting structure, said elastic body elements being of a cross-section and stiffness at which they form with the mass of the instrument body a vibrating system having a resonant frequency of about 1000 cycles per second or less.

20. In an electrical measuring device having a magnetic structure including an intermediate core element and an additional core structure saparated from the opposite sides of the said core element by two generally circular gap regions aligned along the opposite sides of the core element and operative to maintain in said two gap regions a unidirectional magnetic field; a rotatable coil structure comprising a substantial number of coil turns surrounding said core elements and having opposite elongated coil sides for producing a coil deflection around an axis of rotation of said coil corresponding to an electric current therethrough; a suspension structure including two spaced support elements and two elongated suspension members axially aligned along said axis and connected between the other opposite outer transverse coil sides of said coil structure and said two support elements to operate as the sole rotatable supporting connection carrying said coil structure in a floating operative position and restraining its rotation; said suspension structure including an elastically deformable tension structure connected between each of said two support elements and the outer end of the suspension member connected thereto for subjecting said suspension members and said coil structure to axial tension forces for holding said coil structure restrained in its floating condition out of engagement with any portions of said core structure; each suspension member having two suspension filaments extending parallel to each other and spaced portions of said two filaments being interconnected to each other through intermediate integral flexible connecter portions to form conjointly an integral ribbon-like filar member, said two filaments being free from any intermediate interconnection along portions of their length between successive connector portions, the thickness of each connector portion in a direction transverse to the generally flat surface of said ribbon-like filar member being at most half the thickness of each of said filaments so that when such suspension member is twisted by deflection of the coil structure, said two filaments transmit to the coil structure the major part of the restoring forces restraining said coil structure against deflection.

21. In a bifilary suspension member for carrying in a floating operative position a galvanometer coil or the like moving body of an electrical measuring device: two suspension filaments extending parallel to each other and spaced portions of said two filaments being interconnected to each other through intermediate integral flexible connector portions to form conjointly an integral ribbon-like filar member, said two filaments being free from any intermediate interconnection along portions of their length between successive connector portions, the thickness of each connector portion being, in a direction transverse to the generally flat surface of said ribbon-like filar member, at most half the thickness of each of said filaments so that when such suspension member is twisted by deflection of the moving body, said two filaments transmit to the coil structure the major part of the restoring forces restraining said coil structure against deflection.

EMIL H. GREIBACH.

REFERENCES CITED

The following references are of record in the file of this patent:

UNITED STATES PATENTS

| Number | Name | Date |
|---|---|---|
| 334,145 | Weston | Jan. 12, 1886 |
| 1,540,770 | Field | June 9, 1925 |

FOREIGN PATENTS

| Number | Country | Date |
|---|---|---|
| 647,320 | Germany | July 2, 1937 |

OTHER REFERENCES

Publication I, "Electrical Measuring Instruments," by Jolley and Drysdale, vol. 1, pages 42 and 43.